(12) United States Patent
Hobgood et al.

(10) Patent No.: US 7,138,963 B2
(45) Date of Patent: *Nov. 21, 2006

(54) METHOD FOR AUTOMATICALLY TRACKING OBJECTS IN AUGMENTED REALITY

(75) Inventors: Andrew W. Hobgood, Manchester, NH (US); John Franklin Ebersole, Jr., Bedford, NH (US); John Franklin Ebersole, Bedford, NH (US)

(73) Assignee: MetaMersion, LLC, Bedford, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/825,763

(22) Filed: Apr. 16, 2004

(65) Prior Publication Data

US 2004/0212630 A1 Oct. 28, 2004

Related U.S. Application Data

(63) Continuation-in-part of application No. 10/198,584, filed on Jul. 18, 2002.

(51) Int. Cl.
*G09G 5/00* (2006.01)
(52) U.S. Cl. ............... 345/8; 345/7; 345/9; 348/115
(58) Field of Classification Search ............ 345/115, 345/7–9
See application file for complete search history.

(56) References Cited

U.S. PATENT DOCUMENTS 5,815,411 A * 9/1998 Ellenby et al. ............. 702/150
5,838,368 A * 11/1998 Masunaga et al. ......... 348/211.9

* cited by examiner

*Primary Examiner*—Richard Hjerpe
*Assistant Examiner*—Duc Dinh
(74) *Attorney, Agent, or Firm*—Brian M. Dingham; Mirick, O'Connell, DeMallie & Lougee

(57) ABSTRACT

The invention is a method for displaying otherwise unseen objects and other data using augmented reality (the mixing of real view with computer generated imagery). The method uses a motorized camera mount that can report the position of a camera on that mount back to a computer. With knowledge of where the camera is looking, and the size of its field of view, the computer can precisely overlay computer-generated imagery onto the video image produced by the camera. The method may be used to present to a user such items as existing weather conditions, hazards, or other data, and presents this information to the user by combining the computer generated images with the user's real environment. These images are presented in such a way as to display relevant location and properties of the object to the system user. The primary intended applications are as navigation aids for air traffic controllers and pilots in training and operations, and use with emergency first responder training and operations to view and avoid/alleviate hazardous material situations, however the system can be used to display any imagery that needs to correspond to locations in the real world.

16 Claims, 8 Drawing Sheets

METHOD FOR AUTOMATICALLY TRACKING OBJECTS IN AUGMENTED REALITY

CROSS REFERENCE TO RELATED APPLICATION

This application is a continuation in part of patent application Ser. No. 10/198,584, filed on Jul. 18, 2002.

FIELD OF THE INVENTION

This invention relates to the automatic tracking of objects in an augmented reality system.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

This invention can be used any time a user needs to "see" an otherwise invisible object placed within the setting in which it would normally appear, and in this case, onto a video stream. This form of image "augmentation" is known as augmented reality (AR), and in this case is considered video-based AR since it uses a video camera, as opposed to a see-through setup (as might be done with partial mirrors). A video-based AR setup has only a few basic components, including (1) a camera with a known field of view (FOV), (2) a means to determine and adjust the position and orientation of the camera, and (3) a computer that creates computer-generated virtual objects that correspond to what the camera is seeing by using the previous two components.

Typically, one of the physically largest components is the second one, wherein a tracking system is used to determine the position and orientation of the camera. In many applications of video-based AR, the camera does not need to change location in the environment. In these scenarios, however, it is often desirable for the camera to be able to change orientation such that it can view an environment larger in scope than its field of view. In this case, it is possible for the camera to be placed on a motion platform such that the camera can be aimed by a computer system with the use of actuators (usually motors connected to a gear train). Such cameras and camera motion platforms are often referred to as "pan-tilt-zoom" systems. Such systems permit the camera to remain in a fixed location, but have variable orientation which may be controlled by an external system. This can eliminate the requirement for a large, expensive tracking system to determine the position and orientation of the camera.

Often, in these kinds of applications, it is desirable to have the camera's field of view follow a real or virtual object appearing in the scene as it moves through the environment without requiring human intervention.

SUMMARY OF THE INVENTION

The invention creates a system in which a camera motion platform may be automated to keep a particular object within the field of view without human intervention. When using a motion-controlled video camera, it is sometimes useful to superimpose computer-generated graphics onto its view. At the same time, it is often useful to have the camera move such as to keep a particular object within the field of view of the camera. To accomplish that, this invention uses a video camera with a built-in motor and a means for obtaining the position of an object that the camera is intended to track.

The invention creates an AR setup by using a simple, compact, inexpensive, integrated tracking system combined with a video camera in one small unit. Such a camera and tracking combination device is the EVI-D30 Motorized Camera, from Sony. By using this method, the computer has knowledge of where the camera is looking, thereby allowing the computer to superimpose graphical elements representing real objects, anchored in the real world, onto the view of the camera.

The invention can track an object through the environment through any of a number of means. If the environment is instrumented with a traditional position tracking system (such as an InterSense tracker), the object's position can be determined by querying that tracker. If the environment is not instrumented with a tracker, existing computer vision algorithms can be applied to the video stream coming from the camera to determine the position of the object.

This method of automatically following an object using a motorized camera mount can be adapted to a wide variety of situations. The sports entertainment industry could, for example, use this invention to follow an object which can be difficult to see (such as a golf ball or hockey puck). As the camera automatically follows the object, the image can be augmented with any desired graphical content, such as game statistics, advertising, or simulated objects on the field.

This invention facilitates the blending of computer-generated (virtual) graphical elements (which represent real world objects) with the real-world view of the user while following an object through the environment. The motorized camera mount in this invention is used to track the location of the user and of the actual object so that the virtual (computer-generated) imagery can be placed in the same location in which the object would appear if it were actually visible. Superimposing virtual imagery onto a real world scene (which may be static or changing) and presenting the combined image as the "replacement" for the real world image is known as Augmented Reality (AR). The location and properties of the computer generated graphical elements are known and may be input via a human or other means. The user's real world scene/image might consist of scenery that the user can normally see.

The user will visualize the combined virtual and real image using traditional interfaces such as monitors, or the data may be projected into a Head-Mounted Display (HMD). In any case, the real image (e.g., an airfield or airway, along with accompanying structures and aircraft), will be shown, overlaid with computer-generated graphical elements. The net result is an augmented reality.

The invention features a method for using a motorized camera mount for automatic tracking of objects, for augmented reality systems. Real world imagery (captured by video or other method) is input into a system and augmented with computer-generated imagery of otherwise unseen objects and presented to the user as the replacement for the real world image. In one embodiment, the invention is accomplished in a method for automatically tracking an object to keep the object in the field of view of a video camera, and create an augmented reality display comprising the image from the video camera combined with computer-generated graphics to create an augmented reality display, the method comprising resolving the camera's field of view, determining the location of an object to be tracked relative to the camera's field of view, in response to the determined location of the object, moving the camera to maintain the object in the camera's field of view, using a computer to generate a graphical image representing unseen information that corresponds to the camera's viewpoint, and augmenting the video image with the graphical image, to create an augmented-reality image having the tracked object therein, for presentation to a user.

The augmenting step may comprise using onboard video mixing through use of a video capture device with the computer. Alternatively, the augmenting step may comprise using an external video mixing solution, to combine real and computer-generated graphical elements outside of the computer. The invention can be used in different situations, including in operations and in training.

Moving the camera may be accomplished by providing a motorized camera mount for the camera, and controlling the camera mount. In this case, the resolving step may comprise calibrating the camera and camera mount. The camera mount may be coupled to a fixed platform. Alternatively, the resolving step may comprise using the camera and camera mount in conjunction with a separate camera position tracking system to generate a combined position and orientation value. The resolving step may comprise the motorized camera mount reporting the field of view of the camera to the computer. The resolving step may in this case further comprise using the computer to resolve the field of view based on the current camera position received by the computer from the camera, to accomplish a feedback control system. Alternatively, the resolving step may comprise using the computer to position the camera in a feed-forward control system.

The camera mount need not be stationary, but may, for example, be attached to a vehicle, an aircraft, a watercraft or ship, or a gimbaled arm.

DETAILED DESCRIPTION OF THE PREFERRED EMBODIMENTS OF THE INVENTION

Figure 1:
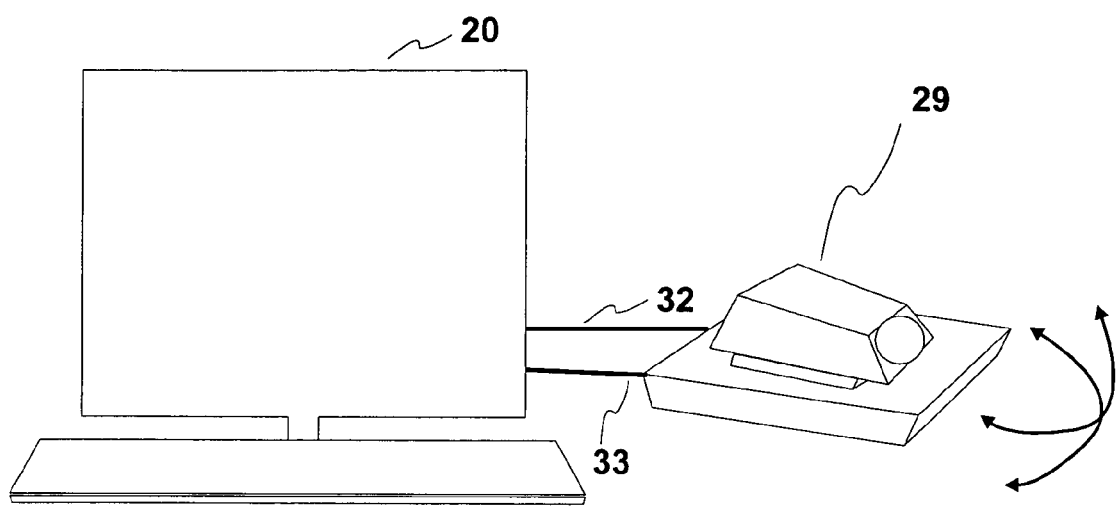
FIG. 1 is a schematic view of a motorized camera and motorized mount connected to a computer for the purpose of tracking and video capture for augmented reality, for use in the preferred embodiment of the invention.

The preferred embodiment of the invention utilizes a motorized camera mount with a built-in position tracker. The inventive system automatically tracks an object in the camera's field of view, so that the object remains properly positioned in the augmented reality (AR) display. The properties of the computer-generated graphical elements are determined by an independent source (e.g., the user, sensor information, or other method of input). The method uses AR (the mixing of real media with computer generated media) to present this information in a format that combines the computer-generated images with the user's real environment. The user then visualizes the combined virtual and real image via a traditional interface such as a computer monitor, or via another method, such as a Head-Mounted Display (HMD).

The captured video image of the real world is mixed with the computer-generated graphical elements via an onboard or external image combiner to form an AR display. Onboard mixing is performed via software. External mixing can be provided by commercial-off-the-shelf (COTS) mixing hardware, such as a Videonics video mixer or Coriogen Eclipse keyer. Such an external solution would accept the video signal from the camera and a computer-generated video signal from the computer and combine them into the final AR image.

This invention can be used to show an object that would otherwise not be visible to the video camera if the video camera had a stationary field of view. Situations where it may be advantageous to represent items in this manner include: (A) a runway/runway lights that can't be seen in a heavy fog by a pilot (here the plane would have other hardware that would determine the location of the runway relative to the present orientation of the plane, and then the computer could augment a view showing this), (B) invisible gases or other dangers (here, sensors could detect the presence and flow of the gases and then display it on the camera to show the user where the gases are in the field of view of the camera), (C) an airport runway controller (or anyone) may want to be able to display the locations of vehicles or other moving objects that are difficult to see in the field of view of the camera, but whose locations are known (for example, at an airport with heavy fog, vehicles (trucks or even planes) could be moving at the airport, and separate sensors (perhaps a radar system, or beacons that transmit back the location of the vehicle) determine the positions of the vehicles for proper display to the viewer).

The invention may also be used in a training scenario. This includes any situation where it would be advantageous to train someone how to do a task by displaying virtual objects onto the view of a camera. For example, training a cameraman to track golf balls at a golf tournament could be accomplished faster and more effectively using the invention.

The base of the camera may or may not be stationary. If the base is not stationary, the moving base must be tracked by a separate 6DOF (degree of freedom) method. This situation could be applicable on a ship, airplane, or automobile where the base of the camera mount is fixed to the moving platform, but not fixed in world coordinates. A GPS tracking system, an optical tracking system, or some other kind of tracking system must provide the position and orientation of the base of the camera. For example, a GPS system could be used to find the position and orientation of the base. It would then use the camera's orientation sensors to determine the camera's orientation relative to the camera's base, the orientation and position of which must be known. Such a system could be placed on a vehicle, aircraft, or ship. Another example would include mounting the camera base on a 6DOF gimbaled. arm. As the arm moves, it can be mechanically tracked in 3D space. Similar to the previous example, this position and orientation can be added to the data from the camera to find the camera's true position and orientation in world coordinates.

The invention may also use an open-loop architecture, in which the computer cannot request a report from the camera containing current orientation data. In this case, the computer drives the camera mount to a specified orientation, and external motion of the camera is not permitted. In such an implementation, the system knows the position of the camera by assuming that the camera, in fact, went to the last location directed by the computer. Similarly, the system may also use a feedback architecture. In this scenario, the system will send a command to the camera to move to a specified position, and then the system may request a report from the camera that contains the current position of the camera, correcting it again if necessary.

Finally, the system may operate in a calibrated configuration, in which a computer-generated infinite horizon and center-of-screen indicator are used to verify anchoring and registration of computer-generated objects to real-world positions. In this case, the computer can know exactly where the camera is looking in fully correct, real world coordinates. The system may also operate in an uncalibrated configuration, which would not guarantee perfect registration and anchoring but which may be suitable in certain lower-accuracy applications.

FIG. 1 illustrates hardware for use in the preferred embodiment of the invention. A motorized video camera 29 is used as a tracking system for AR. By connecting the motorized video camera to the computer 20 via an RS-232 serial cable 33 (for camera control and feedback) and video cable 32, the camera may be aimed, the position of the camera can be queried, and the image seen by the camera may be captured over the video cable 32 by software running on the computer. Additionally, the computer 20 can query the camera 29 for its current field of view, a necessary piece of information if the computer image is to be rendered properly.

Figure 2:
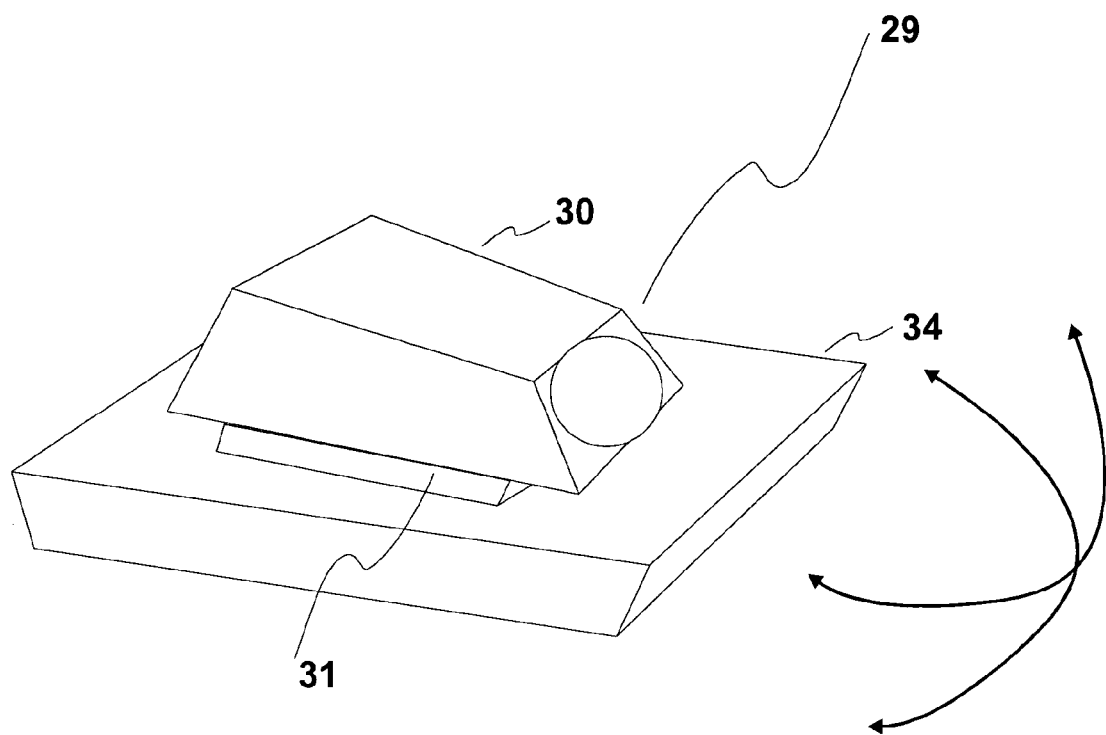
FIG. 2 is a close-up view of the camera and motorized mount of FIG. 1.

FIG. 2 is a close-up view of the preferred Sony EVI-D30 motorized camera. This camera 29 is composed of a head 30 and a base 34 coupled by a motorized mount 31. Mount 31 can be panned and tilted via commands from the computer system, which allows the head 30 to move while the base 34 remains stationary. The camera also has internal software, which tracks the current known pan and tilt position of the head with respect to the base. This information may be queried by computer 20 over the RS-232 serial cable.

The video signal from the camera travels into a video capture, or "frame grabber" device connected to the computer. In this embodiment of the invention, an iRez "USB Live!"™ video capture device is used, which allows software on the computer to capture, modify, and display the image on the screen of the computer. This image source can be combined in the video capture device with computer-generated elements before display, allowing for AR applications.

Figure 3:
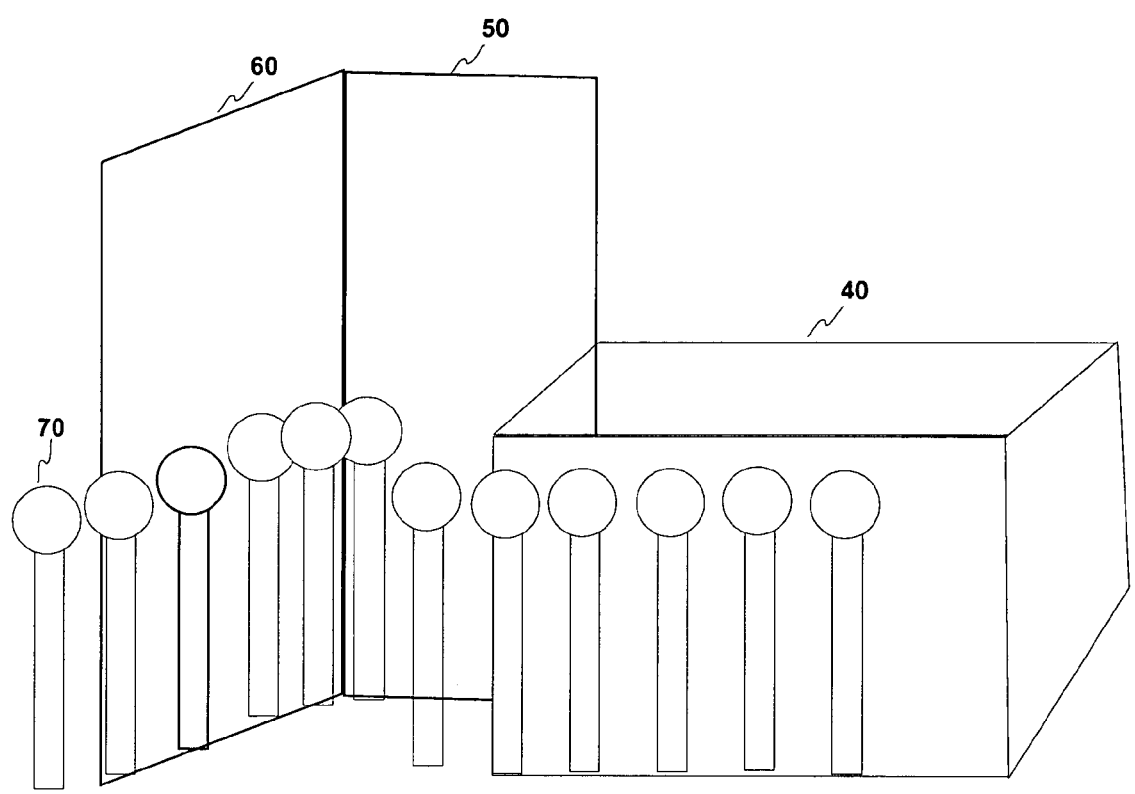
FIG. 3 schematically depicts an augmented reality display with computer-generated indicators displayed over an image as an example of a result of this invention.
Figure 4:
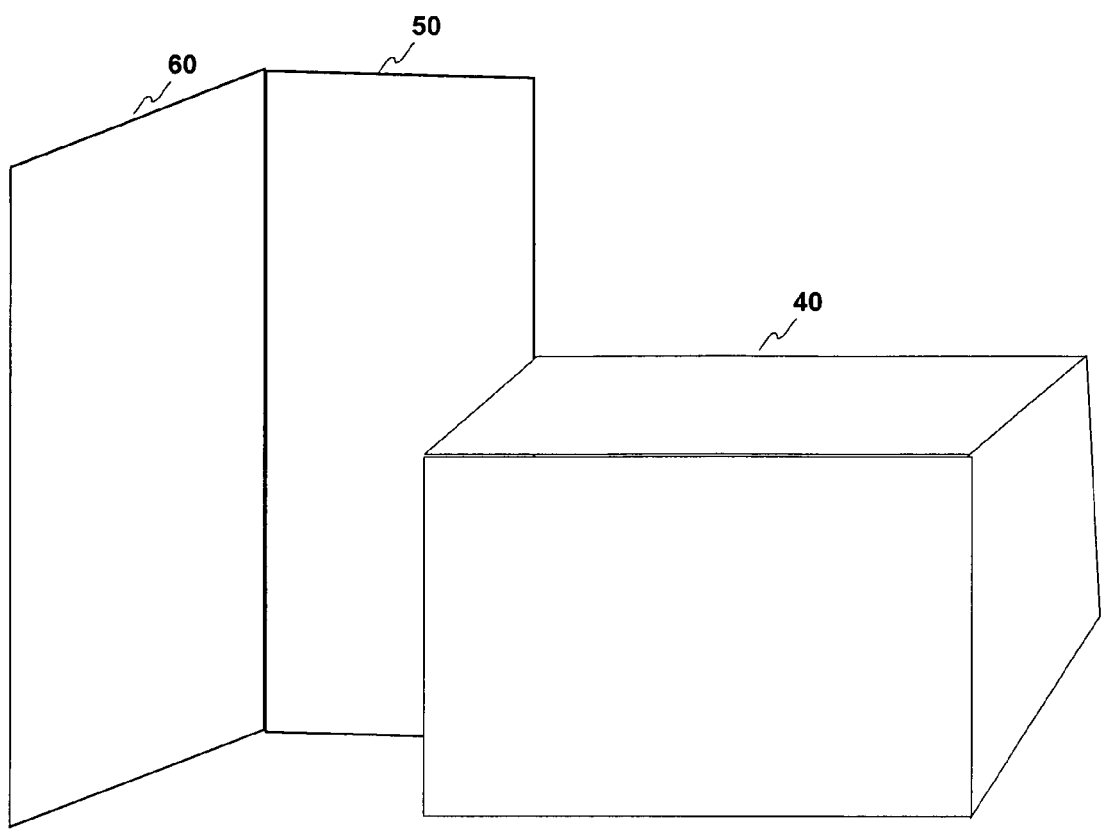
FIG. 4 is the un-augmented scene from FIG. 3 without computer-generated indicators. This image is a real-world image captured directly from the camera.

In FIG. 3, an AR display using the EVI-D30 as a tracked image source is shown. This image is a composite image originally acquired from the camera, which is displayed in FIG. 4, and shows furniture and other items 40, 50, 60 physically located in real space. The software running on the computer then queries the camera for its orientation. The orientation returned from the camera represents the angle of the camera's optics with respect to the base of the camera. By corresponding this information with the known location and orientation of the camera base, a real-world position and orientation can be computed for the camera's optics. These data are then used to render three-dimensional computer-generated poles 70 with proper perspective and screen location, which are superimposed over the image captured from the camera.

Figure 5:
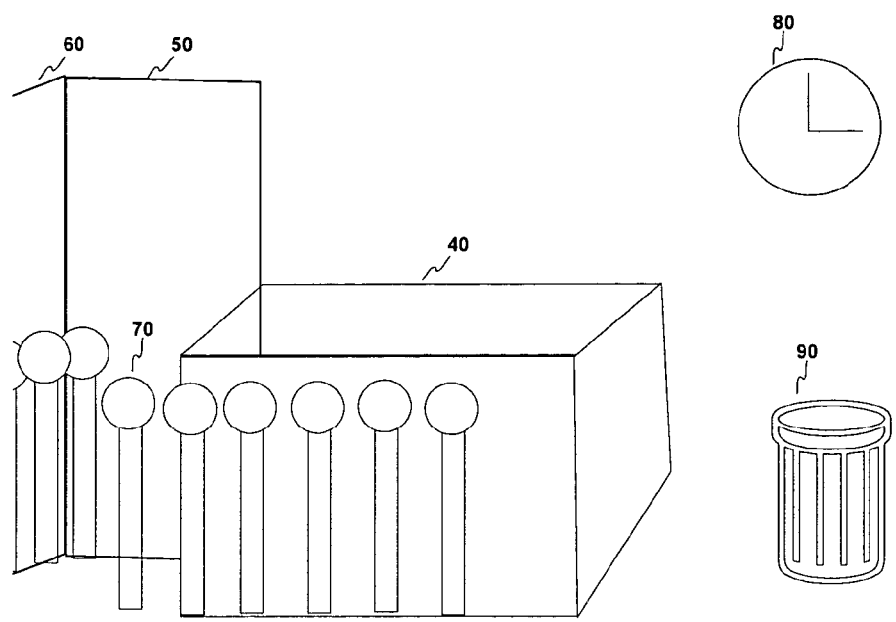
FIG. 5 is an augmented reality display of the same scene as that of FIG. 3 but from a different camera angle where the computer-generated indicators that were in FIG. 3 remain anchored to the real-world image.
Figure 6:
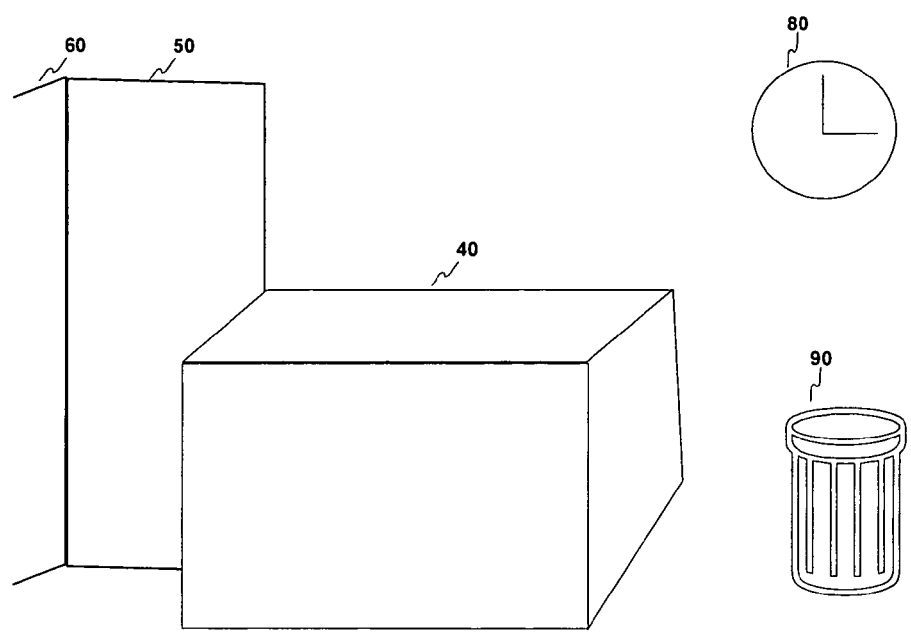
FIG. 6 is the un-augmented scene from FIG. 5 without computer-generated indicators.

FIG. 5 shows the same scene as FIG. 3, but from a different angle. The unaugmented version of FIG. 5 (which is shown in FIG. 6) is captured from the video camera, and the computer-generated elements 70 are again added to the image before display to the user. Note, as the camera angle has changed, the perspective and view angle of the poles 70 has also changed, permitting them to remain anchored to locations in the real-world image.

Figure 7:
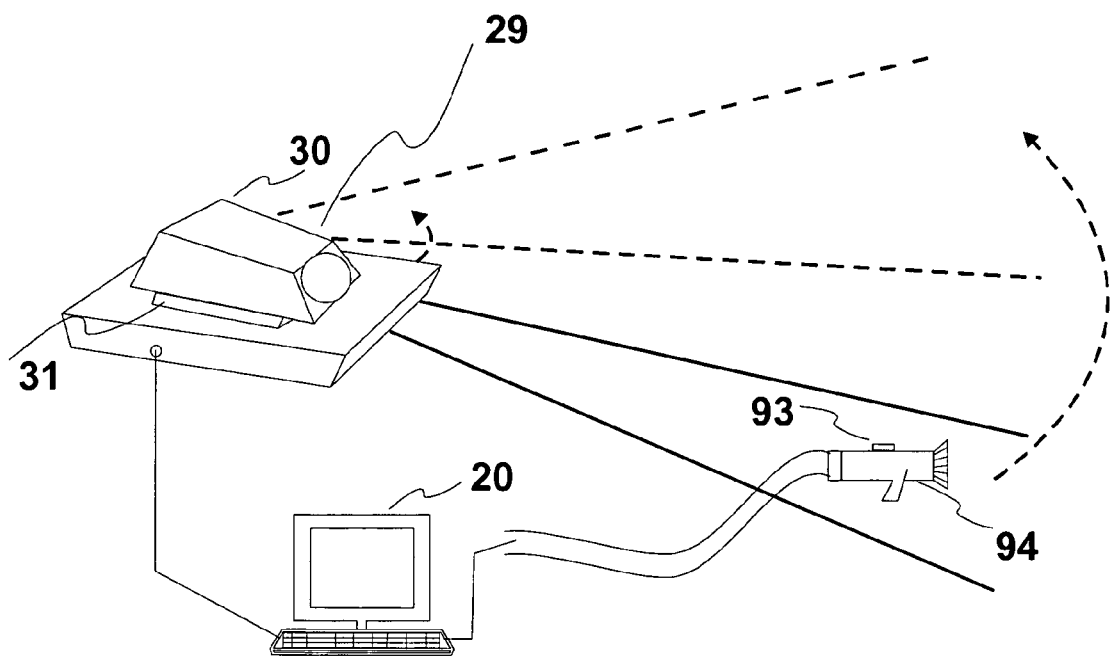
FIG. 7 is a schematic diagram of a system of the invention for automatically tracking an object in an AR system.

FIG. 7 shows a system for automatically tracking an object with a motorized camera mount. The components shown in the system are 3D motion tracker 93 (attached to the tracked object, in this case, a firefighter's nozzle 94), computer 20 (which processes tracking information, performs calculations, and then determines the proper attitude of the motorized camera mount), and motorized camera unit 29 (which integrates a motorized camera mount 31 and a full motion imaging camera 30). The motorized camera maintains a fixed spatial location in the environment, while the nozzle is free to move through the space. As the nozzle leaves the field of view of the camera (shown by solid lines) to a location indicated by arrow "A", the computer determines a new attitude for the camera mount (shown by dotted lines) which will place the nozzle back into the center of the field of view of the camera, and sends signals to camera mount 31 to properly reposition camera 30.

The three-dimensional position of the camera 30 is known by the computer 20, and the three-dimensional position of the nozzle is determined by the tracker 93 and communicated back to the computer 20. By subtracting the camera position from the nozzle position, a three-element vector is found that represents the attitude that would be required of the camera and camera mount to place the nozzle into the center of the field of view. By calculating the dot product of the camera's current orientation with the new view vector projected to the object, the computer 20 determines the object's angular displacement from the center of the camera's field of view. When this number exceeds a particular hysteresis threshold, the computer 20 will send signals to the camera mount 31 to properly reposition the camera 30 such that the object lies in the center of the field of view. The hysteresis can be increased to give the camera greater stability and less "twitch" when following a moving object, while it can be decreased to give the camera better responsiveness.

FIGS. 8A–8D depict this motorized camera mount performing an automatic tracking function. In this scenario, the tracked object is the head 91 of a human user. The user's position can be determined spatially (via a tracking system as was used to track the nozzle in the above example) or angularly (via an image recognition or computer vision algorithm).

If a tracking system is used as above, the system behaves as described in FIG. 7. If a tracking system is not used, an image recognition or computer vision algorithm can be used to determine the object's location in the camera's field of view. Once the object is detected and located, the computer can take the pixel position (a two element vector representing horizontal and vertical components) of the object within the image returned by the camera, and subtract the pixel position that represents the center of the camera's field of view. Then, this vector is multiplied by a conversion factor that is dependent on the angular field of view of the camera and the number of pixels to determine the angular displacement in the horizontal and vertical directions. If either of these exceeds the hysteresis threshold as described in FIG. 7, a new attitude is determined by taking the camera's current attitude and adding the angular displacement of the object from the center of the field of view. This new attitude is then sent to the camera mount to reposition the camera such that the object lies in the center of the camera's field of view.

Figure 8:
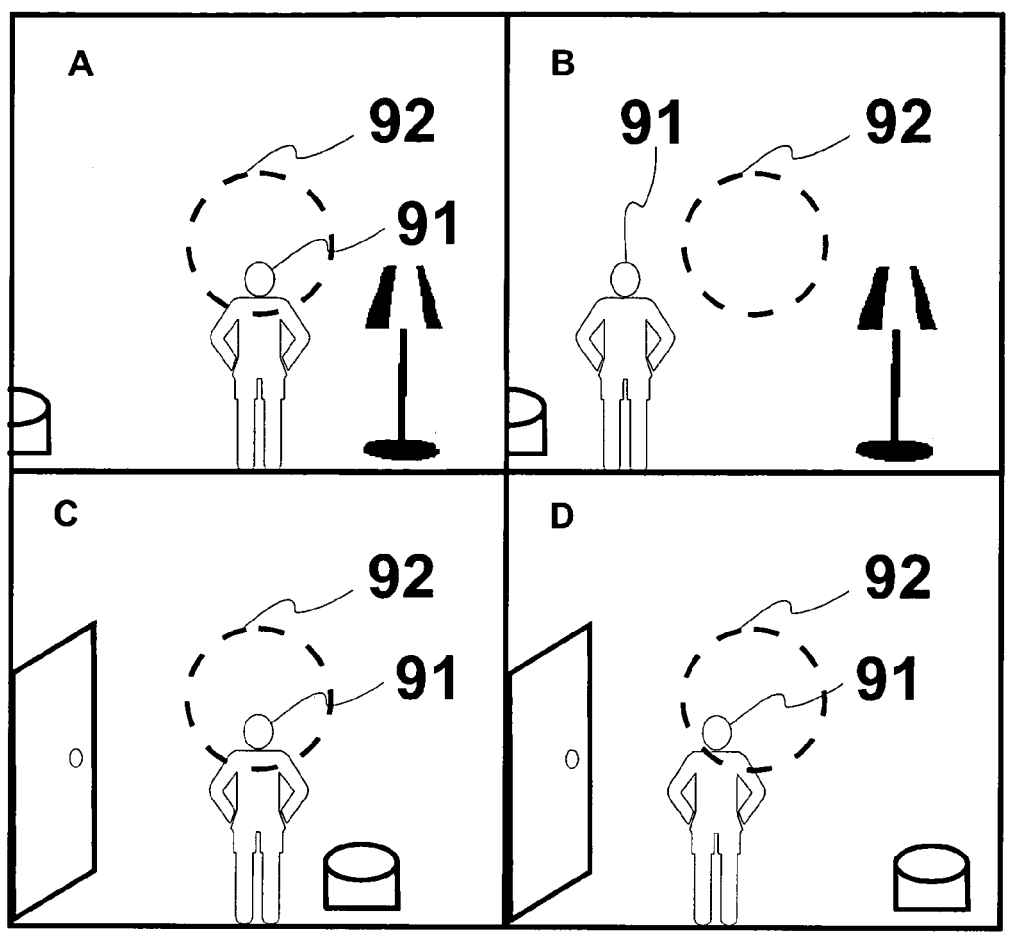
FIGS. 8A–8D schematically illustrate an example of the use of the automatic tracking of the invention.

FIG. 8 illustrates the use of the hysteresis threshold in the system. This hysteresis number is represented by a circle 92 which is all points at a specific angular displacement away from the center of the field of view. When the object has moved out of the hysteresis range 92, the camera determines an optimal view attitude that will place the user back at the center of the field of view and begins to transit to that location. As the user continues to move, the camera continues to attempt to center the user in the field of view. In the above illustration, the first pane (FIG. 8A) shows a user's head 91 (the tracked object) inside of a defined range 92 near the center of the field of view. The second pane (FIG. 8B) shows the user outside of this range, and will trigger the camera to begin motion transit to a new location. In the third pane (FIG. 8C), as the camera "catches up" to the user, and the user is once again located at the center of the field of view, the camera will stop. In the fourth pane (FIG. 8D), the user has yet to leave the defined range, so the camera will not move.

This sort of automatic object tracking behavior is desirable in any AR system in which there is activity in the scene and human intervention is limited. One such application would be in a surveillance scenario. As an intruder moves in the field of view of the camera, it can automatically move to keep the intruder in the center of the field of view, while using AR to overlay a wire frame model of the building, estimated statistics of the intruder (height, clothing, etc.), and even a false-color overlay showing the weapon(s) that the intruder is carrying.

Another useful application is in an AR training system (such as a firefighter training system) in which the location of the nozzle can be used to represent the current point of interest for an external view. This way, the camera can follow the trainees through the environment, while continuing to superimpose the same AR imagery that the trainees see, but from an external view. This can drastically improve training value for large groups.

The preferred embodiment of this invention can be reduced to practice using the hardware and software listed in Table 1.

TABLE 1

| Equipment List | |
|---|---|
| Item | Brand Name |
| EVI-D30 Motorized Camera | SONY |
| Power Supply (for EVI-D30) | SONY |
| Inspiron 8200 Laptop Computer ("Pegasus") | DELL |
| Cable (8-pin Mini-DIN VISCA ™ to 9-pin D-SUB RS-232) | SONY |
| Cable (S-Video) | |

TABLE 1-continued

| Equipment List | |
|---|---|
| Item | Brand Name |
| USB Live! Video Capture Device | IRez |
| IS-600 6DOF Tracking System | InterSense |
| Visual C++ 6.0 (CD) | MICROSOFT |

What is claimed is:

1. A method for automatically tracking an object to keep the object in the field of view of a video camera, and create an augmented reality display comprising the image from the video camera combined with computer-generated graphics to create an augmented reality display, the method comprising:
   providing a motorized camera mount for the camera, and controlling the camera mount using a computer;
   resolving the camera's field of view;
   determining the location of an object to be tracked relative to the camera's field of view;
   in response to the determined location of the object, received by the computer from the motorized camera mount, moving the camera to maintain the object in the camera's field of view;
   wherein the resolving step comprises using the computer to resolve the field of view based on the current camera position received by the computer from the camera mount, to accomplish a feedback control system;
   using the computer to generate a graphical image representing unseen information that corresponds to the camera's viewpoint; and
   augmenting the video image with the graphical image, to create an augmented-reality image having the tracked object therein, for presentation to a user.

2. The method of claim 1 wherein the augmenting step comprises using onboard video mixing through use of a video capture device with the computer.

3. The method of claim 1 wherein the augmenting step comprises using an external video mixing solution, to combine real and computer-generated graphical elements outside of the computer.

4. The method of claim 1 for use in operations.

5. The method of claim 1 for use in training.

6. The method of claim 1 in which the resolving step comprises calibrating the camera and camera mount.

7. The method of claim 1 in which the camera mount is coupled to a fixed platform.

8. The method of claim 1 in which the resolving step comprises using the camera and camera mount in conjunction with a separate camera position tracking system to generate a combined position and orientation value.

9. The method of claim 1 in which the computer controls the camera mount, and the resolving step comprises using the computer to position the camera in a feed-forward control system.

10. The method of claim 1 in which the camera mount is not stationary.

11. The method of claim 10 in which the camera mount is attached to a vehicle.

12. The method of claim 10 in which the camera mount is attached to an aircraft.

13. The method of claim 10 in which the camera mount is attached to a watercraft or ship.

14. The method of claim 10 in which the camera mount is attached to a gimbaled arm.

15. The method of claim 1 in which the resolving step comprises the motorized camera mount reporting the field of view of the camera to the computer.

16. A method for automatically tracking an object to keep the object in the field of view of a video camera, and create an augmented reality display comprising the image from the video camera combined with computer-generated graphics to create an augmented reality display, the method comprising:

provending a motorized camera mount for the camera;
resolving the camera's field of view;
determining the location of an object to be tracked relative to the camera's field of view;
in response to the determined location of the object, moving the camera to maintain the object in the camera's field of view;
using a computer to control the camera mount, and wherein the resolving step comprises using the computer to resolve the field of view based on the current camera position received by the computer from the camera mount, to accomplish a feedback control system;
using the computer to generate a graphical image representing unseen information that corresponds to the camera's viewpoint;
using the computer to control the camera's viewpoint; and
using a video capture device along with the computer to accomplish video mixing that augments the video image with the graphical image, to create an augmented-reality image having the tracked object therein, for presentation to a user.

* * * * *